United States Patent
Waldo et al.

(10) Patent No.: US 10,618,643 B2
(45) Date of Patent: Apr. 14, 2020

(54) ROTOR SHAFT CLOSEOUT PLATE

(71) Applicant: Sikorsky Aircraft Corporation, Stratford, CT (US)

(72) Inventors: Ron William Waldo, North Richland Hills, TX (US); Eric Lucien Nussenblatt, Stamford, CT (US); Bryan Kenneth Baskin, Arlington, TX (US); David H. Hunter, Cheshire, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 729 days.

(21) Appl. No.: 15/101,762

(22) PCT Filed: Dec. 4, 2013

(86) PCT No.: PCT/US2013/073091
§ 371 (c)(1),
(2) Date: Jun. 3, 2016

(87) PCT Pub. No.: WO2015/084340
PCT Pub. Date: Jun. 11, 2015

(65) Prior Publication Data
US 2016/0375995 A1    Dec. 29, 2016

(51) Int. Cl.
*B64C 27/32* (2006.01)
*B64C 27/10* (2006.01)

(52) U.S. Cl.
CPC .............. *B64C 27/32* (2013.01); *B64C 27/10* (2013.01)

(58) Field of Classification Search
CPC ................................ B64C 27/32; B64C 27/10
See application file for complete search history.

(56) References Cited

U.S. PATENT DOCUMENTS

| 4,776,076 | A | 10/1988 | Frank et al. |
| 4,797,064 | A | 1/1989 | Ferris et al. |
| 4,818,179 | A | 4/1989 | Toner et al. |

(Continued)

FOREIGN PATENT DOCUMENTS

KR    20130055846 A    5/2013

OTHER PUBLICATIONS

Notification of Transmittal of the International Search Report and the Written Opinion of the International Searching Authority, or the Declaration for International Application No. PCT/US2013/073091 dated Oct. 29, 2014; dated Oct. 30, 2014; 10 pages.

(Continued)

*Primary Examiner* — Woody A Lee, Jr.
*Assistant Examiner* — Michael L Sehn
(74) *Attorney, Agent, or Firm* — Cantor Colburn LLP (57) ABSTRACT

A rotor hub assembly is provided including an open rotor hub having a base plate and a plurality of rotor members mounted about a circumference of the base plate. The rotor members are configured to form a plurality of rotor blade openings between adjacent rotor members, and a central opening between all of the rotor members. A plate includes a central body portion and a plurality of arms. Each of the plurality of arms is configured to mount to one of the plurality of rotor members such that the central body portion is generally positioned within the central opening of the open rotor hub.

20 Claims, 5 Drawing Sheets

(56) References Cited

U.S. PATENT DOCUMENTS

| | | | |
|---|---|---|---|
| 4,930,983 A | 6/1990 | Byrnes et al. | |
| 5,267,833 A | 12/1993 | Mouille | |
| 5,785,497 A | 7/1998 | White et al. | |
| 6,296,444 B1 | 10/2001 | Schellhase et al. | |
| 7,585,153 B1 * | 9/2009 | Schmaling | B64C 27/10 |
| | | | 416/129 |
| 8,226,355 B2 * | 7/2012 | Stamps | B64C 27/32 |
| | | | 415/119 |
| 2004/0037701 A1 | 2/2004 | Pancotti | |
| 2006/0165527 A1 | 7/2006 | Stamps et al. | |
| 2007/0084962 A1 | 4/2007 | Zientek | |
| 2008/0267778 A1 | 10/2008 | Stamps et al. | |
| 2013/0224507 A1 | 8/2013 | Mancher et al. | |

OTHER PUBLICATIONS

Extended European Search Report; European Application No. 13898735.9; dated Jun. 21, 2017; 5 Pages.

\* cited by examiner

ROTOR SHAFT CLOSEOUT PLATE

BACKGROUND OF THE INVENTION

Exemplary embodiments of the invention generally relate to rotary wing aircrafts, and more particularly, to a plate for an open rotor hub of a counter-rotating rotary wing aircraft.

A helicopter rotor hub is the primary structural assembly for driving torque to each rotor blade, balancing centrifugal loads between opposing rotor blades, and transferring lift loads to the aircraft fuselage. In a counter-rotating rotary wing aircraft, controls and components, such as pitch control rods for example, are arranged within the hollow interior of the upper rotor shaft. When a conventional rotor hub is used in the counter-rotating rotary wing aircraft, a large opening is generally machined into the hub to provide access and/or visual inspection of the components within the upper rotor shaft.

BRIEF DESCRIPTION OF THE INVENTION

According to one embodiment of the invention, a rotor hub assembly is provided including an open rotor hub having a base plate and a plurality of rotor members mounted about a circumference of the base plate. The rotor members are configured to form a plurality of rotor blade openings between adjacent rotor members, and a central opening between all of the rotor members. A plate includes a central body portion and a plurality of arms. Each of the plurality of arms is configured to mount to one of the plurality of rotor members such that the central body portion is generally positioned within the central opening of the open rotor hub.

Alternatively, in this or other aspects of the invention, each of the plurality of arms is positioned adjacent a central, upper surface of the plurality of rotor members.

Alternatively, in this or other aspects of the invention, each of the plurality of arms includes at least one connection hole. For each rotor member, a fastener mounts the arm to the rotor member through the corresponding connection hole.

Alternatively, in this or other aspects of the invention, the central body portion includes at least one control opening configured to provide a visual of or access to one or more components arranged within a shaft coupled to the open rotor hub.

Alternatively, in this or other aspects of the invention, the plurality of arms of the plate is substantially equal to the plurality of rotor blade openings of the open rotor hub.

Alternatively, in this or other aspects of the invention, each of the plurality of arms is substantially identical.

Alternatively, in this or other aspects of the invention, the plate is substantially symmetrical about an axis perpendicular to an axis of rotation of a shaft configured to couple to the open rotor hub.

Alternatively, in this or other aspects of the invention, a plurality of protrusions extends generally vertically from an upper surface of the plate. The protrusions are configured to connect to a rotor fairing.

Alternatively, in this or other aspects of the invention, at least one area of removed material is formed in a lower surface of the plate.

Alternatively, in this or other aspects of the invention, the at least one area of removed material includes a plurality of areas of removed material. A plurality of ribs is formed between adjacent area of removed material.

According to another embodiment of the invention, a rotary wing aircraft is provided including an airframe and a main rotor system. The main rotor system includes a lower rotor and an upper rotor configured to rotate about an axis of rotation. The upper rotor includes an upper rotor shaft and an open rotor hub mounted to the upper rotor shaft. The open rotor hub has a base plate and a plurality of rotor members mounted about a circumference of the base plate. The rotor members are configured to form a plurality of rotor blade openings between adjacent rotor members, and a central opening between all of the rotor members. A plate includes a central body portion and a plurality of arms. Each of the plurality of arms is configured to mount to one of the plurality of rotor members such that the central body portion is generally positioned within the central opening of the open rotor hub. A plurality of rotor blades is coupled to the plurality of rotor blade openings of the open rotor hub.

Alternatively, in this or other aspects of the invention, each of the plurality of arms is positioned adjacent a central, upper surface of the plurality of rotor members.

Alternatively, in this or other aspects of the invention, each of the plurality of arms includes at least one connection hole. For each rotor member, a fastener mounts the arm to the rotor member through the corresponding connection hole.

Alternatively, in this or other aspects of the invention, the central body portion includes at least one control opening configured to provide a visual of or access to one or more components arranged within a shaft coupled to the open rotor hub.

Alternatively, in this or other aspects of the invention, the plurality of arms of the plate is substantially equal to the plurality of rotor blade openings of the open rotor hub.

Alternatively, in this or other aspects of the invention, each of the plurality of arms is substantially identical.

Alternatively, in this or other aspects of the invention, the plate is substantially symmetrical about an axis perpendicular to an axis of rotation of a shaft configured to couple to the open rotor hub.

Alternatively, in this or other aspects of the invention, a plurality of protrusions extends generally vertically from an upper surface of the plate. The protrusions are configured to connect to a rotor fairing.

Alternatively, in this or other aspects of the invention, at least one area of removed material is formed in a lower surface of the plate.

Alternatively, in this or other aspects of the invention, the at least one area of removed material includes a plurality of areas of removed material. A plurality of ribs is formed between adjacent area of removed material.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
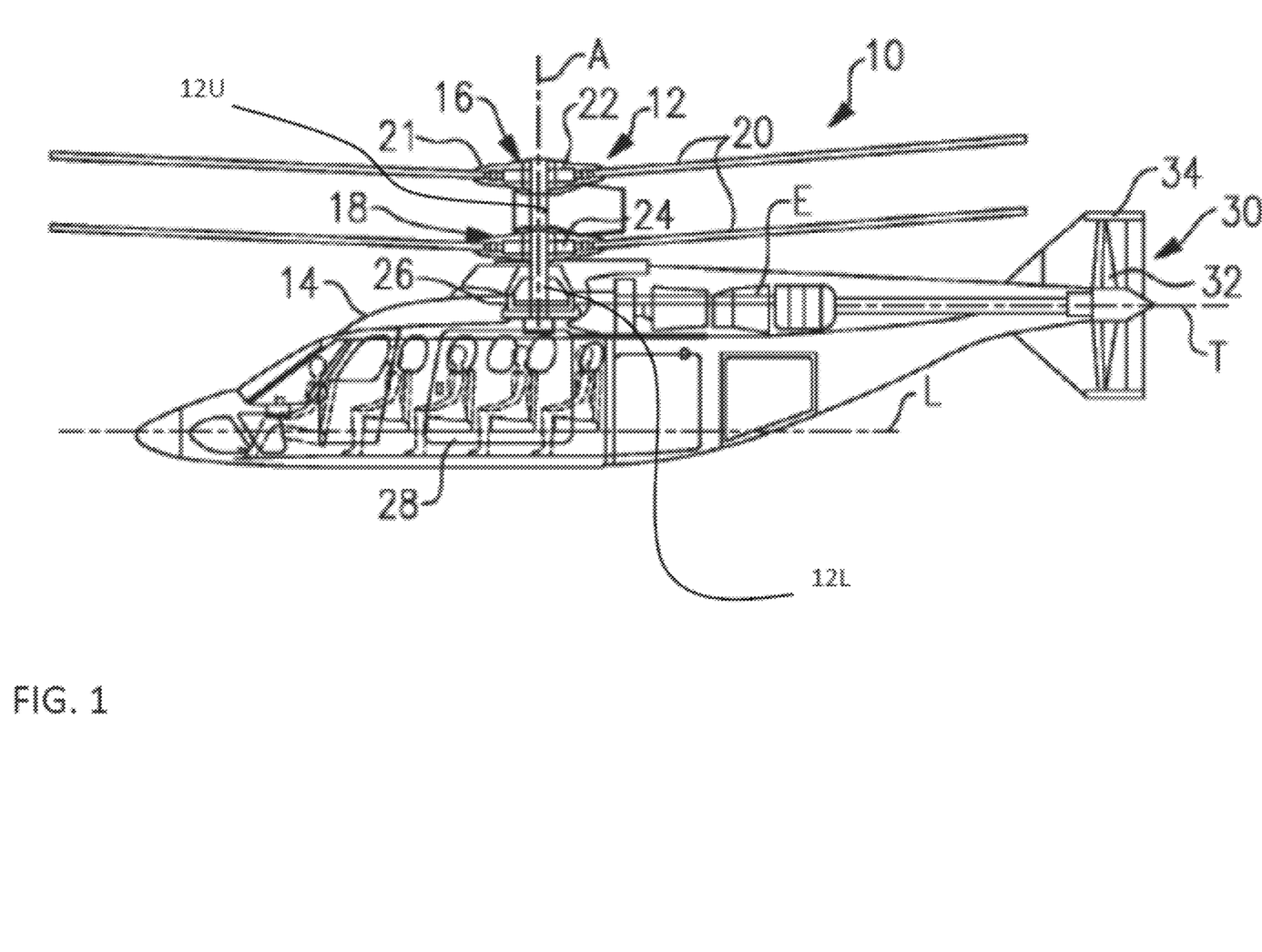
FIG. 1 is a view of an example of a counter-rotating rotary wing aircraft.
Figure 2:
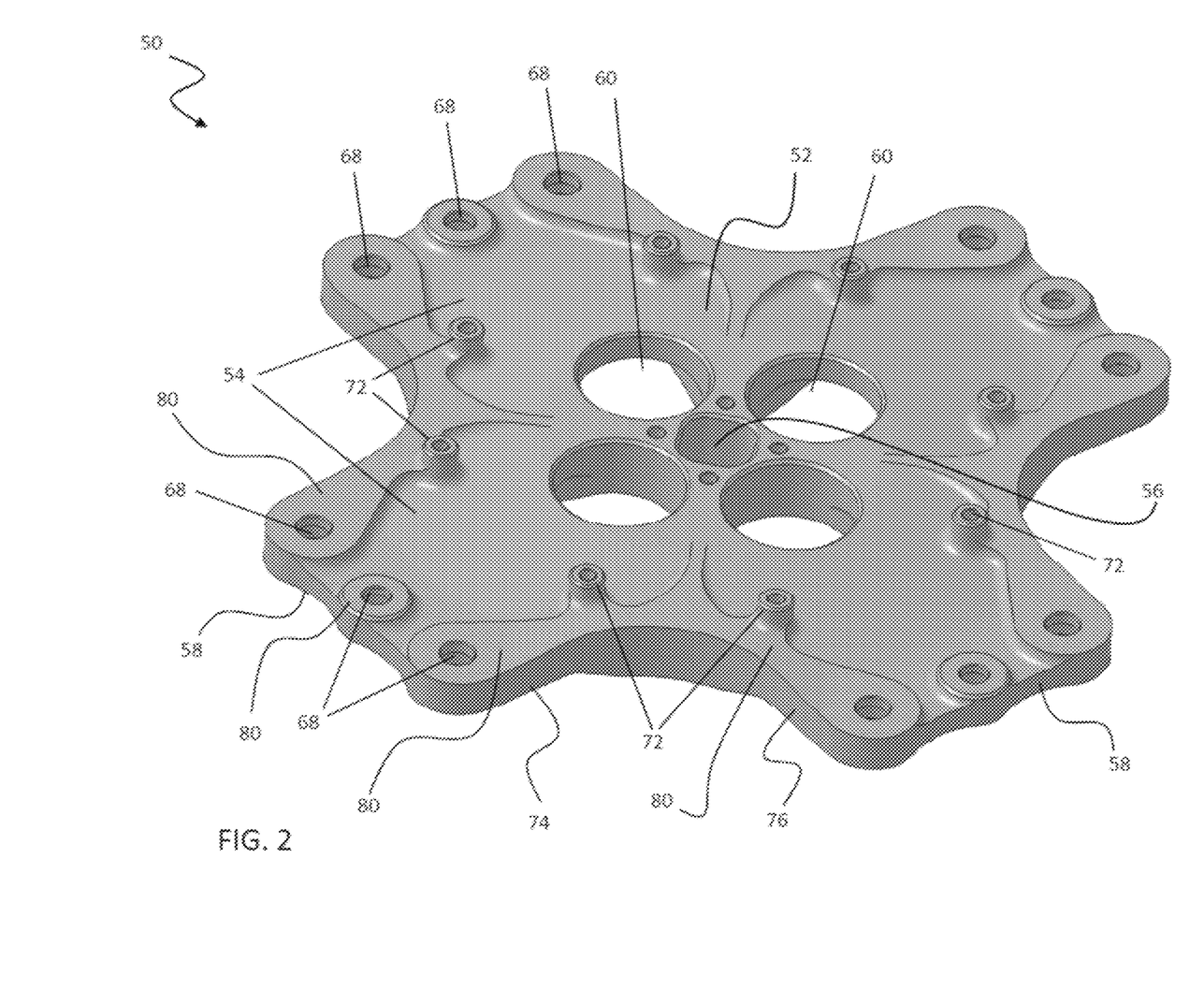
FIG. 2 is a perspective view of a plate configured to mount to an open rotor hub of a rotary wing aircraft according to an embodiment of the invention.
Figure 3:
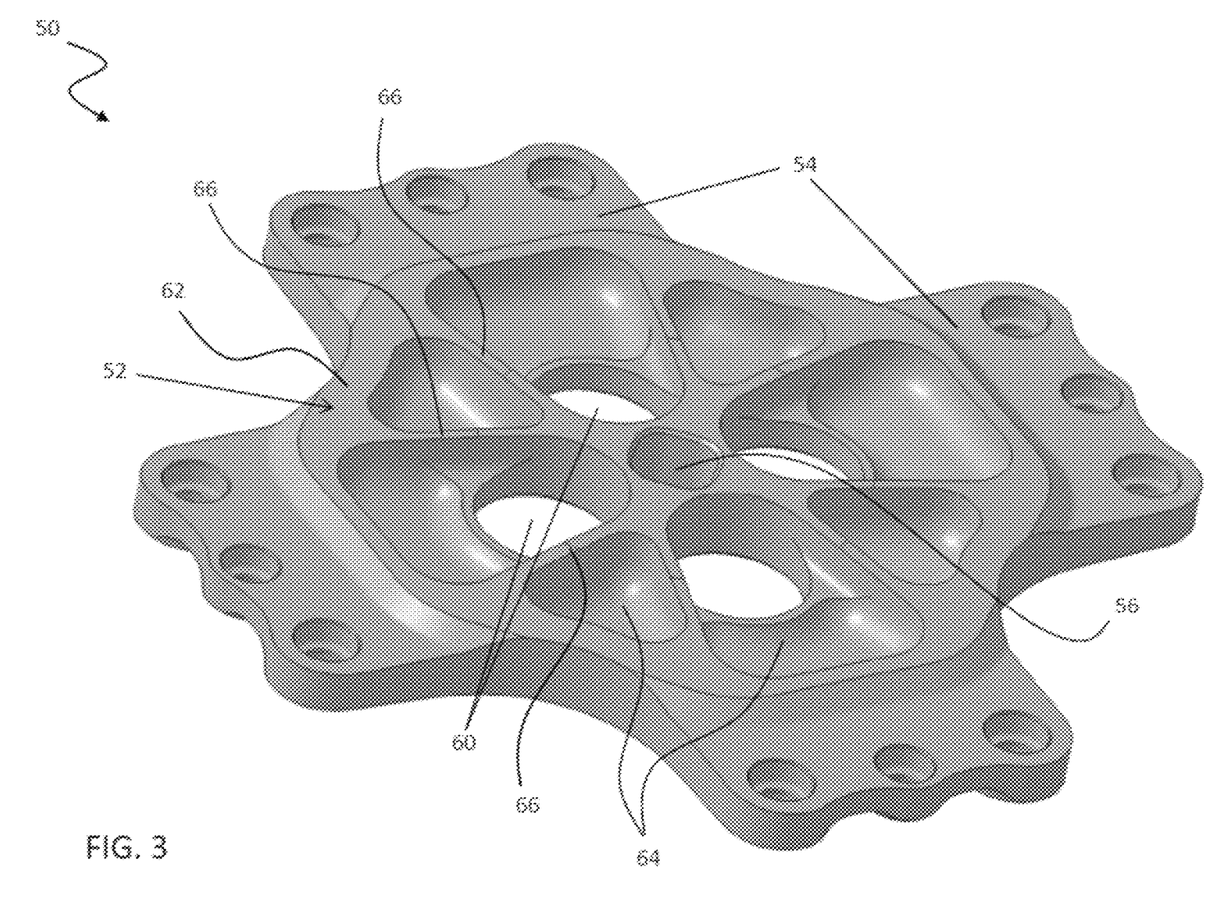
FIG. 3 is another perspective view of a plate configured to mount to an open rotor hub of a rotary wing aircraft according to an embodiment of the invention.

FIG. 1 illustrates an exemplary vertical takeoff and landing (VTOL) aircraft 10 having a dual, counter-rotating, coaxial rotor system 12 which rotates about an axis of rotation A. The aircraft 10 includes an airframe 14 which supports the dual, counter rotating, coaxial rotor system 12 as well as an optional translational thrust system 30 which provides translational thrust generally parallel to an aircraft longitudinal axis L. Although a particular aircraft configuration is illustrated in this non-limiting embodiment, other counter-rotating, coaxial rotor systems will also benefit from the present invention.

The dual, counter-rotating, coaxial rotor system 12 includes an upper rotor system 16 and a lower rotor system 18. Each rotor system 16, 18 includes a plurality of rotor blades 20 mounted to a rotor hub 22, 24 for rotation about a rotor axis of rotation A. A plurality of the main rotor blades 20 project substantially radially outward from the hub assemblies 22, 24, respectively. Any number of rotor blades 20 may be used with the rotor system 12. The upper rotor hub 22 is driven by an upper rotor shaft 12U, and the lower rotor hub 24 is driven by a lower rotor shaft 12L.

A main gearbox 26 which may be located above the aircraft cabin 28 drives the rotor system 12. The translational thrust system 30 may be driven by the same main gearbox 26 which drives the rotor system 12. The main gearbox 26 is driven by one or more engines (illustrated schematically at E). The gearbox 26 may be interposed between the gas turbine engines E, the rotor system 12 and the translational thrust system 30.

The translational thrust system 30 may be mounted to the rear of the airframe 14 with a rotational axis T oriented substantially horizontal and parallel to the aircraft longitudinal axis L to provide thrust for high-speed flight. The translational thrust system 30 includes a pusher propeller 32 mounted within an aerodynamic cowling 34. Although a tail mounted translational thrust system 30 is disclosed in this illustrated non-limiting embodiment, it should be understood that any such system or other translational thrust systems including tractor and pod mounted systems may alternatively or additionally be utilized.

Referring now to FIGS. 2-5, a plate 50 configured to attach to an open rotor hub, such as rotor hub 22 of the upper rotor system 16 for example, is illustrated. The plate 50 includes a central body portion 52 and a plurality of arms 54. The plate 50 is configured to be received within a central opening 96 (FIG. 5) of the rotor hub 22. The plurality of arms 54 extend from the central body portion 52. While not limited thereto, the arms 54 and central body portion 52 can be a continuous material, such as where the entire plate 50 is milled from a common piece of metal or forged from the same material. Arranged near the center 56 of the central body portion 52 is at least one opening. In an embodiment, the at least one opening includes at least one control opening 60 configured to provide a mechanic or inspector with a visual of one or more control rods or wires (not shown) positioned within the hollow upper rotor shaft 12U of the rotor system 12. In the illustrated, non-limiting embodiment, the central body portion 52 includes a plurality of substantially identical control opening 60 spaced equidistantly from one another about the center 56.

Figure 4:
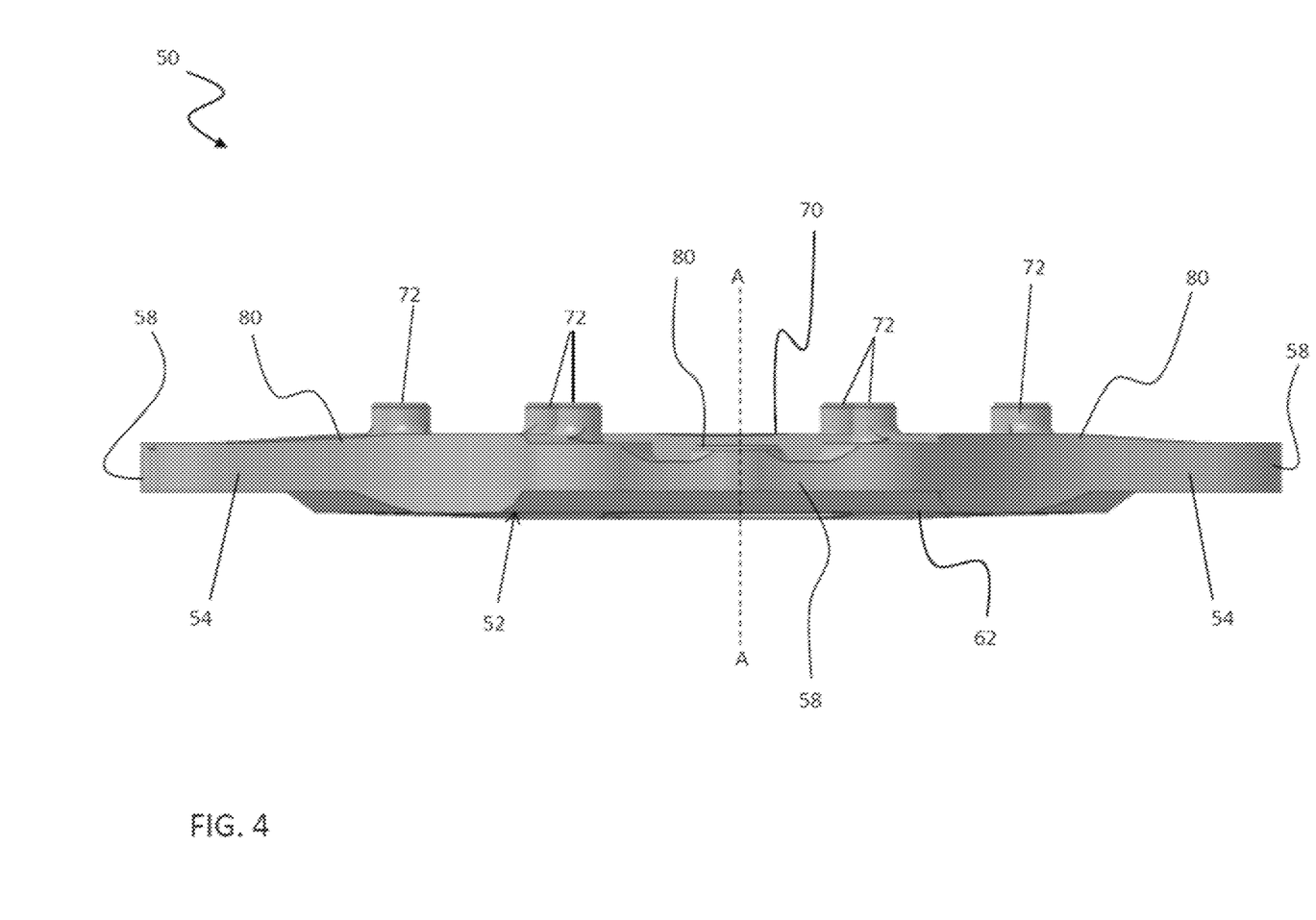
FIG. 4 is a side view of a plate configured to mount to an open rotor hub of a rotary wing aircraft according to an embodiment of the invention.

The thickness of the central body portion 52 of the plate 50 is generally greater than the thickness of each of the plurality of arms 54 (FIG. 4). At least one area of removed material 64 is formed in a first, lower surface 62 of the central body portion 52 to reduce the material, and therefore the weight, of the plate 50. In one embodiment, the first surface 62 includes a plurality of areas of removed material 64. The areas of removed material 64 may be similar, or alternatively, may be substantially different in shape and/or size. The areas of removed material 64 are generally separated from one another by a distance such that a rib 66 is formed between adjacent areas 64. The ribs 66 provide the central body portion 52 with a desired stiffness and strength. In the illustrated, non-limiting embodiment, the width of each of the plurality of ribs 66 formed in the bottom surface 62 is substantially identical.

The plurality of arms 54 extends substantially coplanar with and outwardly from the central body portion 52 of the plate 50. The plurality of arms 54 may be equal to or less than the plurality of rotor blades 20 coupled to the rotor hub 22 of the upper rotor system 16. In the illustrated, non-limiting embodiment, each of the plurality of arms 54 is substantially identical such that the plate 50 is substantially symmetrical about an axis perpendicular to the axis of rotation A of the rotor system 12. Arranged near the distal end 58 of each arm 54 is a plurality of similar or different connection holes 68, configured to couple the arm 54 to a portion of rotor hub 22 using a plurality of fasteners 100 (FIG. 5), such as bolts and shear pins for example. A plurality of generally hollow protrusions 72 may extend generally vertically from a second, upper surface 70 of the plate 50 near an interface between the central body portion 52 and each arm 54. In the illustrated non-limiting embodiment, each arm 54 includes a first protrusion 72 adjacent a first side 74 of the arm 54 and a second protrusion 72 adjacent a second, opposite side 76 of the arm 54. The protrusions 72 may be substantially identical or different and are configured to couple the plate 50 and the rotor hub 22 to a rotor fairing (not shown) to limit the drag force generated by the rotor hub 22 while the rotary wing aircraft 10 is in flight. However, it is understood that other items could be attached to the protrusions 72 or that the protrusions 72 need not be used in all aspects of the invention.

A portion 80 of each arm 54, such as about a circumference of the plurality of connection holes 68 or adjacent the plurality of protrusions 72 for example, may have an increased thickness to provide additional strength and stiffness to the plate 50. In one embodiment, the portion of increased thickness 80 of each arm 54 may be integrally formed with a portion of increased thickness of an adjacent arm 54. For example, a first side 74 of a first arm 54 and a second side 76 of an adjacent arm 54 may be connected by a single portion 80 of increased thickness. While not required in all aspects, the increased thickness 80 of each arm 54 can be shaped to evenly distribute the forces between the fasteners 100.

Figure 5:
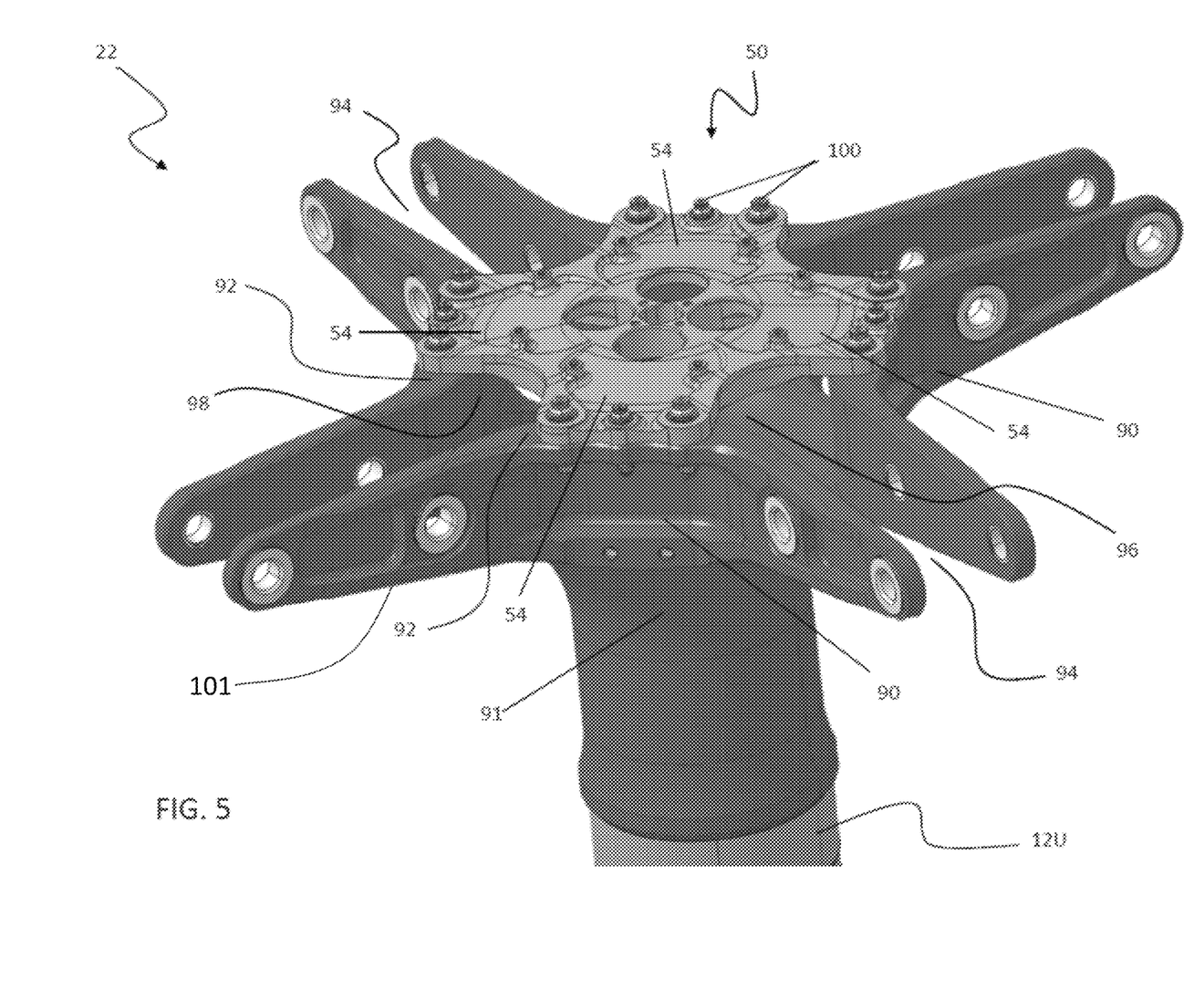
FIG. 5 is a perspective view of an assembled plate and open rotor hub of a rotary wing aircraft according to an embodiment of the invention.

Referring now to FIG. 5, a new, easier to manufacture, open rotor hub 22 was designed to facilitate access to and the service of components within the interior of the upper rotor shaft 12U. The open rotor hub 22 includes a plurality of similar rotor members 90 mounted about a circumference of a base plate 91 connected to the upper rotor shaft 12U to form a central opening 96. The base plate 91 includes a base plate opening 101, exposed to the central opening 96, for access to the components within the upper rotor shaft 12U. Each rotor blade 20 is mounted in an opening 94 formed between adjacent rotor members 90. Despite the use of a high strength, lightweight metal or alloy to form the rotor members, the open hub design has significantly less material to counteract the bending force and deflection generated by each rotor blade 20 when the rotary wing aircraft operates at high speeds. The use of the close out plate 50 according to aspects of the invention counteracts these forces, provides an attachment point at the top of the upper rotor shaft 12U, and/or is removable to allow access inside a hollow area inside the upper rotor shaft 12U.

When the close out plate 50 is mounted to the hub 22, each arm 54 connects centrally to an upper surface 92 of a rotor member 90, between the openings 94 for adjacent rotor blades 20. In addition, the first surface 62 of the central body portion 52 is received within the central opening 96 of the rotor hub 22 such that the central body portion 52 is generally adjacent an inner surface 98 of each rotor member 90 of the rotor hub 22. As shown, plate 50 is attached to the hub 22 with a plurality of fasteners 100 such that the plate 50 may be removed for inspection and repairs internal to the upper rotor shaft 12U, and then reattached when the inspection and repairs are completed. However, in aspects where there is no need for access internal to the shaft 12U, the fasteners 100 need not be removable and the plate 50 could be permanently affixed to the shaft 12U.

By attaching the plate 50 to the rotor members 90 of the open rotor hub 22, the strength and stiffness of the rotor hub 22 is increased while still allowing visual inspection of the controls and components mounted within the upper rotor shaft. In addition, because the frequency generated by the rotor blades depends on the stiffness of the rotor hub, the frequency of the rotor blades 20 mounted to the upper rotor hub 22 may be generally complementary to the frequency of the rotor blades 20 mounted to the lower rotor hub 24.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A rotor hub assembly comprising:
    an open rotor hub rotatable about an axis of rotation, the open rotor hub including:
        a base plate having a base plate opening; and
        a plurality of rotor members mounted about a circumference of the base plate, the rotor members being configured to form a plurality of rotor blade openings between adjacent rotor members and a central opening between all of the rotor members open to the base plate opening; and
    a plate including a central body portion and a plurality of arms, each arm of the plurality of arms is configured to mount to one of the plurality of rotor members such that the central body portion is generally arranged within the central opening of the open rotor hub, where each arm of the plurality of arms has a center between a first side and a second side, and a thickness at both the first side and the second side of the arm is greater than a thickness at the center, the thickness being measured parallel to the axis of rotation.

2. The rotor hub assembly according to claim 1, wherein each arm of the plurality of arms is positioned adjacent a central, upper surface of the plurality of rotor members.

3. The rotor hub assembly according to claim 1, wherein each arm of the plurality of arms includes at least one connection hole, and, for each rotor member, a fastener mounts the arm to the rotor members through the corresponding connection hole.

4. The rotor hub assembly according to claim 1, wherein the central body portion includes at least one control opening configured to provide a visual of and/or access to one or more components arranged within a shaft coupled to the open rotor hub.

5. The rotor hub assembly according to claim 1, wherein a total number of the plurality of arms of the plate is substantially equal to a total number of the plurality of rotor blade openings of the open rotor hub.

6. The rotor hub assembly according to claim 1, wherein each arm of the plurality of arms is substantially identical.

7. The rotor hub assembly according to claim 6, wherein the plate is substantially symmetrical about an axis perpendicular to an axis of rotation of a shaft configured to couple to the open rotor hub.

8. The rotor hub assembly according to claim 1, wherein a plurality of protrusions extend generally vertically from an upper surface of the plate, the protrusions being configured to connect to a rotor fairing.

9. The rotor hub assembly according to claim 1, wherein at least one area of removed material is formed in a lower surface of the plate.

10. The rotor hub assembly according to claim 9, wherein the at least one area of removed material comprises a plurality of areas of removed material, and a plurality of ribs is formed between adjacent areas of removed material.

11. A rotary wing aircraft comprising:
    an airframe; and
    a main rotor system including a lower rotor and an upper rotor configured to rotate about an axis of rotation, the upper rotor including:
        an upper rotor shaft;
        an open rotor hub mounted to the upper rotor shaft, the open rotor hub having a base plate including a base plate opening and a plurality of rotor members mounted about a circumference of the base plate, the rotor members being configured to form a plurality of rotor blade openings between adjacent rotor members and a central opening between all of the rotor members open to the base plate opening;
        a plate including a central body portion and a plurality of arms, each arm of the plurality of arms being configured to mount to one of the plurality of rotor blade members such that the central body portion is generally arranged within the central opening of the open rotor hub, where each arm of the plurality of arms has a center between a first side and a second side, and a thickness at both the first side and the second side of the arm is greater than a thickness at the center, the thickness being measured parallel to the axis of rotation; and
        a plurality of rotor blades coupled to the plurality of rotor blade openings of the open rotor hub.

12. The rotary wing aircraft according to claim 11, wherein each arm of the plurality of arms is positioned adjacent a central, upper surface of the plurality of rotor members.

13. The rotary wing aircraft according to claim 11, wherein each arm of the plurality of arms includes at least one connection hole, and, for each rotor member a fastener mounts the arm to the rotor members through the corresponding connection hole.

14. The rotary wing aircraft according to claim 11, wherein the central body portion includes at least one control opening configured to provide a visual of and/or access to one or more components arranged within the upper rotor shaft.

15. The rotary wing aircraft according to claim 11, wherein the plurality of arms of the plate is substantially equal to the plurality of rotor blades, and each arm is arranged between two adjacent rotor blade openings of the open rotor hub.

16. The rotary wing aircraft according to claim 11, wherein each arm of the plurality of arms is substantially identical.

17. The rotary wing aircraft according to claim 11, wherein the plate is substantially symmetrical about an axis substantially perpendicular to the axis of rotation of the upper rotor shaft.

18. The rotary wing aircraft according to claim 11, wherein a plurality of protrusions extend generally vertically from an upper surface of the plate, the protrusions being configured to connect to a rotor fairing.

19. The rotary wing aircraft according to claim 11, wherein at least one area of removed material is formed in a lower surface of the plate.

20. The rotary wing aircraft according to claim 19, wherein the at least one area of removed material comprises a plurality of areas of removed material, and a plurality of ribs is formed between adjacent areas of removed material.

* * * * *